Aug. 26, 1958  D. V. McLEAN  2,849,252
CAN HANDLE
Filed April 2, 1956
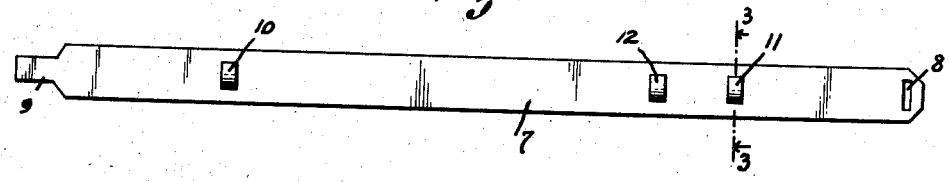
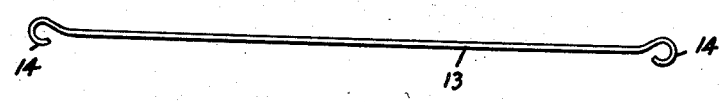
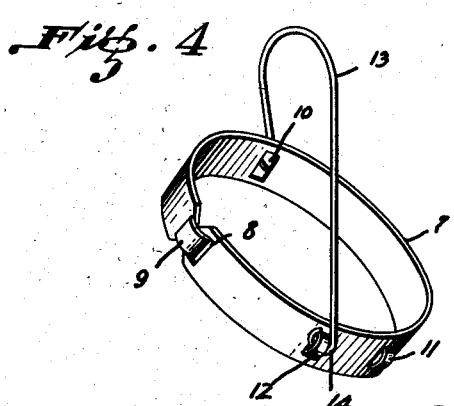
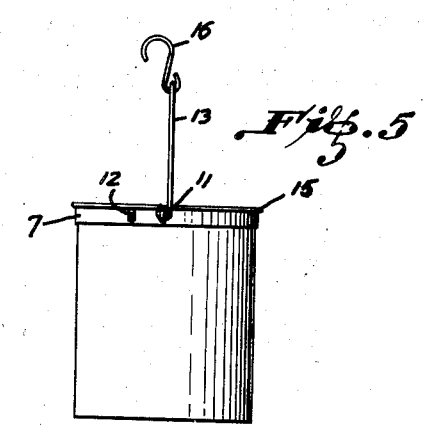
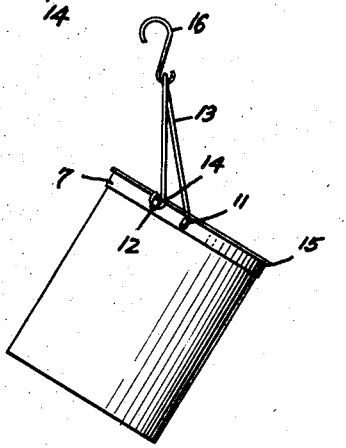
INVENTOR
D. V. McLEAN
BY
ATTORNEY

United States Patent Office 2,849,252
Patented Aug. 26, 1958

2,849,252

CAN HANDLE

Duart V. McLean, Lachine, Montreal, Canada

Application April 2, 1956, Serial No. 575,577

2 Claims. (Cl. 294—31.2)

This invention is a new and useful improvement in can handles or bales for containers, adapted particularly for use in connection with paint or varnish cans, but not necessarily restricted in such use.

The primary object of the invention is to provide means for ready attachment to a can having the usual seam or outwardly projecting flange at the upper end thereof whereby a handle may be readily attached to said means to provide a supporting member for the can.

A further object of the invention is to provide means in the form of a flexible band for attachment around the can for snug engagement therewith beneath the usual outwardly projecting seam or flange at the upper edge thereof, and to which a supporting bale or handle may be readily attached in order to provide support for the can.

A further object of the invention is to provide means in connection with the upper end of a can whereby a bale attached thereto may be secured at its ends out of alignment diametrically of the can in order that when suspended by the bale the can will assume a tilted or angular position with respect to the suspending bale.

A still further object of the invention is to provide a bale attachment for containers of the character generally described which is extremely simple in construction, which may be manufactured and marketed at minimum cost, which is constructed in such manner as to be packaged by simple and expedient means, which may be readily attached to or removed from the can by simple operations and without requiring special skill or instructions, which provides means of improved nature to enable the bale to be connected to the encircling band in such manner as to suspend the can at a desired angle, and which will prove highly effective in use.

With the foregoing objects in view, together with others which will appear as the description proceeds, the invention resides in the novel construction, combination and arrangement of parts, all as will be described more fully hereinafter, illustrated in the drawing and particularly pointed out in the claims.

In the drawings:

Fig. 1 is a plan view of the can encircling band constructed in accordance with my invention, Fig. 2 is a similar view of the handle or bale to be associated with the band, Fig. 3 is a transverse sectional view taken upon line 3—3 of Fig. 1, Fig. 4 is a perspective view showing the band bent and locked to a position encircling the can and with the bale attached thereto in position for tilting the can, Fig. 5 is a side elevation of a conventional can showing the band and bale attached thereto and in the position they will assume under normal conditions, and Fig. 6 is a view similar to Fig. 5 with one bale end moved and secured to the band out of transverse alignment with the opposite bale end in order to bring about the tilting position of the can.

Referring now more particularly to the drawing, 7 represents generally the can encircling band which may be formed of thin inexpensive material capable of being easily produced at low cost and of such length as to entirely encircle the can with which it is to be used. This band is provided at one end with a transversely disposed slot 8 to receive a tongue 9 projecting from the opposite end of the band in order that the band may be securely and snugly locked around the circumference of the can.

This band is provided in its outer surface with means for the ready attachment of the ends of a supporting bale. In the present instance, these means include loop members indicated at 10 and 11 cut from the band body and bent outwardly therefrom as shown more particularly in Figs. 3 and 4. The loops 10 and 11 are so located as to lie in true diametrical alignment when the band is secured around the body of the can as shown in Figs. 4 and 5. The band 7 is also provided with an additional loop member indicated at 12 spaced longitudinally of the band a short distance beyond the loop 11 and inwardly thereof upon the band.

The bale for the can is indicated generally at 13, and this bale is formed in the present instance of a flexible or pliable wire provided at each end with a hook 14 for ready engagement in the loop members of the band. It will be understood that this bale will be sufficiently long so that when bent upon itself as shown in Figs. 4 to 6 inclusive it will provide an arcuate handle for support of the can.

In practice, the band is applied circumferentially upon the outer surface of the can and the tongue 9 is passed through the slot 8 and bent backwardly upon itself as shown in Fig. 4. This arrangement assures a snug engagement of the band upon the can surface and it will be understood that its upward movement upon the can will be limited by the outwardly directed seam or flange 15 usually present at the top of the can. The bale is then bent upon itself and the hooks 14 thereof are engaged in the loops 10—11 at diametrically opposite sides of the can. When in this position, the can may be readily carried in true upright position from place to place or may be suspended upon a ladder rung or other support by a hook 16 as will be understood.

It is frequently desirable to maintain the can in tilted position, in which event it is but necessary to remove one of the hooks 14 of the bale from its first position and to engage the hook with the loop member 12 which is out of diametrical alignment with the loop member 10 at the opposite side of the can. By this arrangement it is apparent that when the bale is supported from above, as shown in Fig. 6, the can will assume the tilted position indicated. In instances when the contents is paint, and when the liquid level in the can permits, this adjustment of the bale enables the user to insert and withdraw his brush or other instrument without contacting the hand which holds the bale, as well as to avoid smearing the bale with paint during these operations. Moreover, the provision for this tilting adjustment enables the user to adequately reach the contents of the can when it is nearing exhaustion.

It will be readily seen from the foregoing that my improved can attachment may be made from extremely inexpensive materials and by simplified processes. The unassembled band and bale will be marketed in flat form as shown in Fig. 1 and 2 and may be easily packaged together. The simplicity of the fastening means enables the band to be readily and properly applied to the can without special ability or instruction. The bale may with equal facility be applied to the band for supporting the can in either the straight or angular positions.

I claim:

1. A bail attaching means for cylindrical containers, comprising a retaining band to encircle the container, a bail pivotally engaged at its ends at diametrically opposite points in said band, one of said bail ends being detachable from said band, and a member projecting outwardly from said band at one side thereof and out of diametrical alignment with said bail end pivots for pivotal engagement by said detachable bail end.

2. In a bail attachment for cylindrical containers, a circular retaining band for engagement around the container at one end thereof, a bail member pivotally secured at its ends at diametrically opposite points upon the exterior of said band, and a loop projecting outwardly from said band adjacent to one of the pivotal connections of the bail therewith and out of diametrical alignment with said pivotal connections, whereby one end of said bail may be engaged in said loop to bring about automatic tilting of the container when supported by said bail.

References Cited in the file of this patent

UNITED STATES PATENTS

| | | |
|---|---|---|
| 1,474,685 | Parnell | Nov. 20, 1923 |
| 2,740,655 | Maly | Apr. 3, 1956 |